(12) United States Patent
Rogitz

(10) Patent No.: US 9,357,051 B2
(45) Date of Patent: *May 31, 2016

(54) TELEPHONE MESSAGING PRIVACY

(71) Applicant: John L. Rogitz, San Diego, CA (US)

(72) Inventor: John L. Rogitz, San Diego, CA (US)

(73) Assignee: Parmenion LLC, Greybull, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,124

(22) Filed: Nov. 4, 2015

(65) Prior Publication Data

US 2016/0057274 A1     Feb. 25, 2016

Related U.S. Application Data

(63) Continuation of application No. 14/676,091, filed on Apr. 1, 2015, now Pat. No. 9,210,250, which is a continuation of application No. 14/269,449, filed on May 5, 2014, now Pat. No. 9,026,085, which is a continuation of application No. 13/971,375, filed on Aug. 20, 2013, now Pat. No. 8,761,819, which is a continuation of application No. 12/869,339, filed on Aug. 26, 2010, now Pat. No. 8,554,253.

(51) Int. Cl.
| | |
|---|---|
| *H04M 1/66* | (2006.01) |
| *H04M 1/725* | (2006.01) |
| *H04W 12/02* | (2009.01) |
| *H04W 4/14* | (2009.01) |

(52) U.S. Cl.
CPC ...... *H04M 1/72552* (2013.01); *H04M 1/72577* (2013.01); *H04W 4/14* (2013.01); *H04W 12/02* (2013.01)

(58) Field of Classification Search
CPC ......... H04W 4/14; H04W 4/12; H04W 8/245; H04W 88/02; H04W 12/06; H04H 60/27; B04N 7/17309; H04L 29/08108; H04M 3/42042; H04M 3/56
USPC .............. 455/466, 418, 416, 3.06, 3.05, 3.03, 455/412.1, 415, 414.1, 422.1; 726/26; 379/158, 202.01; 340/995.19
See application file for complete search history.

(56) References Cited

U.S. PATENT DOCUMENTS

| | | |
|---|---|---|
| 5,958,005 A | 9/1999 | Thorne et al. |
| 6,072,944 A | 6/2000 | Robinson |
| 6,112,983 A | 9/2000 | Stewart et al. |
| 6,510,381 B2 | 1/2003 | Grounds et al. |
| 6,529,942 B1 | 3/2003 | Gilbert |
| 6,701,347 B1 | 3/2004 | Ogilvie |
| 6,920,564 B2 | 7/2005 | Decuir |
| 7,149,893 B1 | 12/2006 | Leonard et al. |
| 7,336,943 B2 | 2/2008 | Crocker et al. |
| 7,493,365 B2 | 2/2009 | Wies et al. |
| 7,526,477 B1 | 4/2009 | Krause |
| 7,703,140 B2 | 4/2010 | Nath et al. |

(Continued)

FOREIGN PATENT DOCUMENTS

| | | |
|---|---|---|
| CN | 1798386 A | 7/2006 |
| EP | 1077421 A2 | 2/2001 |
| WO | 2006034942 A1 | 4/2006 |

*Primary Examiner* — Charles Appiah
*Assistant Examiner* — Alexander Yi
(74) *Attorney, Agent, or Firm* — John L. Rogitz

(57) ABSTRACT

A user can select to automatically delete sent and received text messages from a phone, to avoid complications of another person having access to the phone reading stored messages.

16 Claims, 2 Drawing Sheets

(56) References Cited

U.S. PATENT DOCUMENTS

| | | |
|---|---|---|
| 7,783,715 B2 | 8/2010 | Muller |
| 7,912,908 B2 | 3/2011 | Cai et al. |
| 7,917,285 B2 | 3/2011 | Rothschild |
| 7,978,353 B2 | 7/2011 | Kasatani |
| 8,069,209 B1 | 11/2011 | Levesque et al. |
| 8,073,122 B2 | 12/2011 | Kay et al. |
| 8,103,724 B2 | 1/2012 | Dawson et al. |
| 8,141,131 B2 | 3/2012 | Nakamura et al. |
| 8,171,523 B2 | 5/2012 | Weksler et al. |
| 8,423,618 B1 | 4/2013 | Spivack et al. |
| 8,832,201 B2 | 9/2014 | Wall |
| 2003/0126215 A1 | 7/2003 | Udell et al. |
| 2003/0131057 A1 | 7/2003 | Basson et al. |
| 2004/0073362 A1 | 4/2004 | Fabian et al. |
| 2005/0091499 A1 | 4/2005 | Forlenza et al. |
| 2005/0164720 A1 | 7/2005 | Huang |
| 2005/0204008 A1 | 9/2005 | Shinbrood |
| 2005/0235163 A1 | 10/2005 | Forlenza et al. |
| 2005/0267937 A1 | 12/2005 | Daniels et al. |
| 2006/0019634 A1 | 1/2006 | Hawkes |
| 2006/0148496 A1 | 7/2006 | Zhu et al. |
| 2006/0184628 A1 | 8/2006 | Coley et al. |
| 2007/0005713 A1 | 1/2007 | LeVasseur et al. |
| 2007/0073816 A1 | 3/2007 | Kumar et al. |
| 2007/0143423 A1 | 6/2007 | Kieselbach et al. |
| 2008/0133673 A1 | 6/2008 | Abdelhadi et al. |
| 2008/0281930 A1 | 11/2008 | Hartselle et al. |
| 2009/0214034 A1 | 8/2009 | Mehrotra et al. |
| 2009/0319623 A1 | 12/2009 | Srinivasan et al. |
| 2010/0042690 A1 | 2/2010 | Wall |
| 2010/0146580 A1 | 6/2010 | Chen et al. |
| 2010/0157061 A1 | 6/2010 | Katsman et al. |
| 2010/0319003 A1 | 12/2010 | Halevi |
| 2011/0106894 A1 | 5/2011 | Hodge et al. |
| 2011/0113109 A1 | 5/2011 | LeVasseur et al. |
| 2011/0191487 A1 | 8/2011 | Ziems |
| 2011/0213845 A1 | 9/2011 | Logan et al. |

TELEPHONE MESSAGING PRIVACY

I. FIELD OF THE INVENTION

The present application relates generally to telephone messaging privacy.

II. BACKGROUND OF THE INVENTION

Short message service (SMS) text messages can be sent from and received by many wireless telephones. A user manipulates the keys on the telephone key pad to send messages and received messages are presented on a small telephone display. As understood herein, telephones capture and store both sent and received messages. The messages can be deleted individually but unless one does so, another person can access those messages if the owner leaves the phone lying about. Which can be inconvenient, as it were.

SUMMARY OF THE INVENTION

Present principles facilitate a telephone-texting person to "avoid complications".

Accordingly, a wireless telephone includes a processor, a computer readable storage medium accessible by the processor and bearing instructions executable by the processor, and a wireless telephony transceiver accessible by the processor to send and receive text messages and voice messages. A display is controlled by the processor to present images thereon. Also, a keypad includes plural keys manipulable by a person to input signals to the processor. The processor accesses the medium to execute the instructions to present a user interface (UI) on the display bearing selector elements selectable by manipulation of one or more keys on the keypad prior to receipt of an incoming text message and/or prior to generation of an outgoing text message to input a desire to automatically delete sent text messages, and/or to automatically delete received text messages. The processor, responsive to a determination that the user has input a desire to automatically delete sent text messages, automatically deletes the outgoing text message following transmission thereof through the transceiver, and/or responsive to a determination that the user has input a desire to automatically delete received text messages, automatically deletes the incoming text message following viewing thereof on the display.

In example embodiments the UI bears first and second selector elements respectively selectable to input a desire to automatically delete sent text messages, and to automatically delete received text messages. The UI may also bear a selector element selectable to input a desire to automatically delete both sent text messages and received text messages, as well as a selector element selectable to input a desire to reset automatic deletion of text messages such that no messages are automatically deleted.

Responsive to a determination that the user has input a desire to automatically delete sent text messages, the outgoing text message can be automatically deleted from the medium following transmission thereof. Also, responsive to a determination that the user has not input a desire to automatically delete sent text messages, the outgoing text message is not automatically deleted from the medium following transmission thereof.

If desired, responsive to a determination that the user has input a desire to automatically delete received text messages, the incoming text message is automatically deleted from the medium following viewing of the message. Responsive to a determination that the user has not input a desire to automatically delete received text messages, the incoming text message may not be automatically deleted from the medium following viewing. In example embodiments the incoming text message is automatically deleted from the medium as soon as the user navigates away from a display showing the incoming text message.

In another aspect a method includes determining whether user input indicating automatic text message deletion has been received at a wireless telephone, and automatically deleting a text message from a wireless telephone responsive to user input indicating automatic text message deletion being received before the text message is generated, to avoid complications of another person having access to the phone reading stored text messages.

In another aspect, a wireless telephone includes a processor, a computer readable storage medium accessible by the processor and bearing instructions executable by the processor, and a wireless telephony transceiver accessible by the processor to send and receive text messages and voice messages. A display is controlled by the processor to present images thereon. Also, a keypad includes plural keys manipulate by a person to input signals to the processor. The processor accesses the medium to execute the instructions to automatically delete sent and/or received text messages from a phone responsive to user input received prior to generation of the text messages being deleted, to avoid complications of another person having access to the phone reading stored messages.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
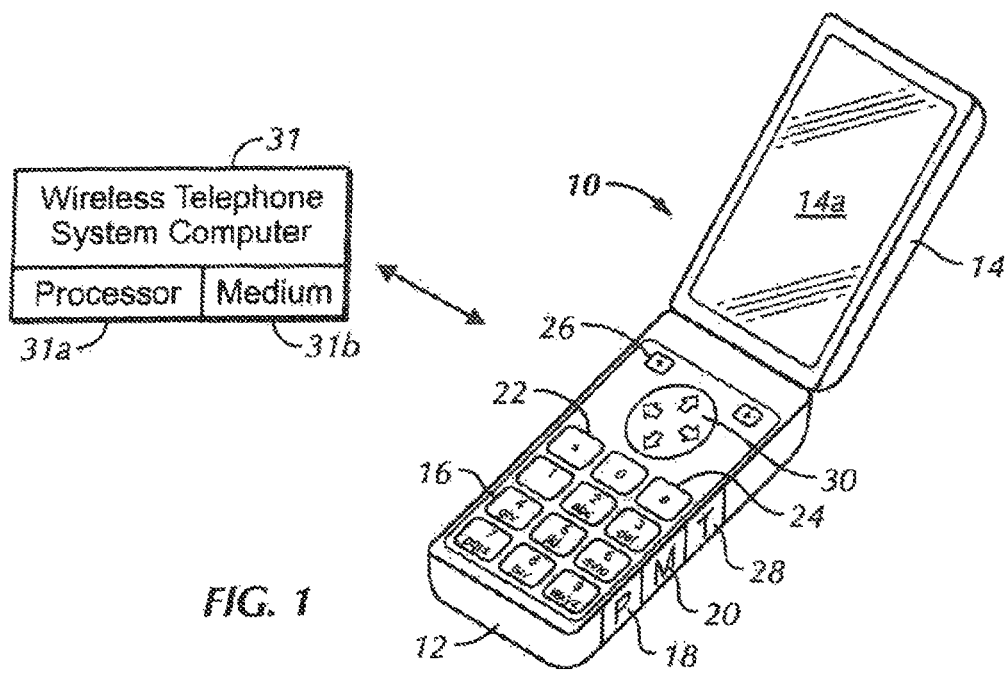
FIG. 1 is a schematic view of an example wireless telephone text messaging system.

Referring initially to FIG. 1, a wireless telephone 10 includes a keypad panel 12 hingedly connected to a display panel 14 bearing a visual display 14 that may instantiated by a liquid crystals display (LCD) or other matrix-type display or other type of display. In some embodiments the panels 12, 14 may be integrated as a single panel.

The keypad panel 12 bears plural number keys 16 that can be manipulated by a person to input number and letter signals to a processor 18 accessing a non-traasitory computer readable storage medium 20 such as disk-based or solid state storage, removable in some implementations from the panel 12. The medium 20 can store sent and received text messages as well as instructions that are executable by the processor 18 for undertaking logic disclosed herein. The medium 20 can bear instructions to facilitate the sending and receiving of short message service (SMS) text messages. More than a single medium 20 may be used or combined.

As shown, in typical embodiments the number "2" key can be used to input the numeral "2" as well as the letters a-c by successively clicking the key until the desired letter appears on the display 14*a* for input. Similarly, the number "3" key can be used to input "3" and the letters d-f "4" key to input "4"

and the letters g-I, "5" key to input "5" and the letters j-l, "6" key to input "6" and the letters m-o, "7" key to input "7" and the letters p-s, "8" key to input "8" and the letters t-v, and "9" key to input "9" and the letters w-z. A "0" key can also be provided as shown to input the numeral "0". If desired, an asterisk key 22 may be provided to input an asterisk and a pound key 24 may be provided to input a pound sign.

Further, one or more control keys 26 can be borne by the keypad panel 12 to input to the processor 18 various signals the meanings of which may vary depending on the context of the user interface (UI) presented on the display 14a. The processor 18 can access a wireless telephony transceiver 28 to wirelessly send and receive voice and text signals to a wireless telephony network. Without limitation, the transceiver 28 may be a global systems for mobile communication (GSM) transceiver, a code division multiple access (CDMA) transceiver, variations and modifications, as well as other types of wireless telephony transceivers including, without limitation, TDMA, FDMA, SDMA, wideband-CDMA, orthogonal frequency division multiplexing (OFDM), etc.

Also, a rocker-type cursor movement key 30 may be provided that when pressed near it top moves a display 14a cursor up on the display 14a, when pressed near its bottom moves the cursor down, when pressed near its right moves the cursor right, and when pressed near its left moves the cursor left. Text messages sent to and received from the telephone 10 may be stored in a wireless telephony computer 31 having a computer processor 31a and computer data storage medium 31b.

Figure 2:
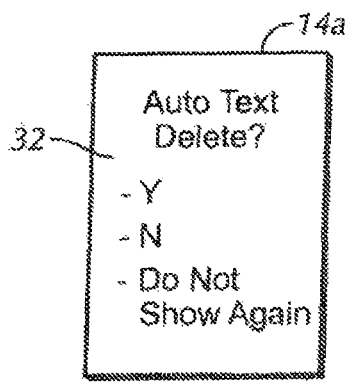
FIGS. 2-4 are example screen shots for implementing present principles.
Figure 3:
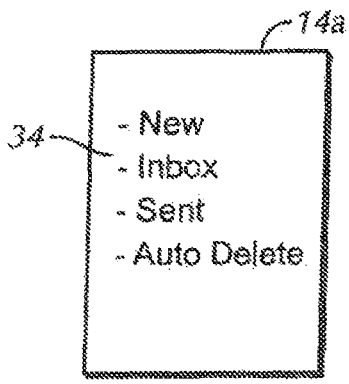

FIG. 2 shows a UI 32 which may be presented on the display 14a when, for example, the user for the first time presses a control key 26. As shown, the UI 32 enables a user to select whether she wishes to invoke automatic text message deletion by selecting "yes" if she does and "no" if she does not. The user may also wish to select "do not show again" so that the next time the control key 26 is presented, the UI 32 will not be shown. Instead, the UI 34 shown in FIG. 3 is presented on the display 14a which allows a user to select to type in a new text message, to access her inbox of received text messages, or to access her sent box containing sent messages. Selection of "inbox" causes the latest received text message to be presented on the display 14a, and using the cursor movement key 30 the user can scroll through other stored messages in her inbox files. Likewise, selection of "sent" causes the latest sent text message to be presented on the display 14a, and using the cursor movement key 30 the user can scroll through other stored messages in her "sent" file. The message files typically are stored on the medium 20. Also, as a stored message is displayed, the user typically is given the option of manually deleting the message, and of manually deleting all messages in that file. However, absent present principles that is the only way for the user to delete her messages. The UI 34 may also include an "auto delete" selector element as shown to allow the user to invoke once again the UI 32 shown in FIG. 2 even if the user had selected "do not show again" from the UI 32 initially, i.e., the user can change her mind about auto deletion.

Figure 4:
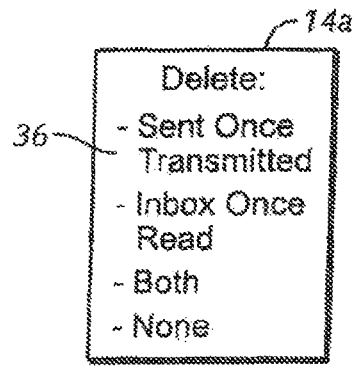

Upon selecting the "yes" selector in the UI 32 of FIG. 2 or the "auto delete" selector in the UI 34 of FIG. 3, a UI 36 in FIG. 4 is presented on the display 14a. As shown, the user is given the option of selecting to automatically delete from the medium 20 each outgoing message once sent, or to automatically delete each received message from the medium 20 after viewing once, or to select both. Also, in the event the user has selected auto delete but then changes her mind, she may select "none" as shown to reset the auto delete feature so that no messages are automatically deleted. The user's selections are recorded on, e.g., the medium 20.

It is to be understood that while particular terminology is shown in FIGS. 2-4 for the example selector elements, other terminology may be used without loss of generality or claim scope.

Figure 5:
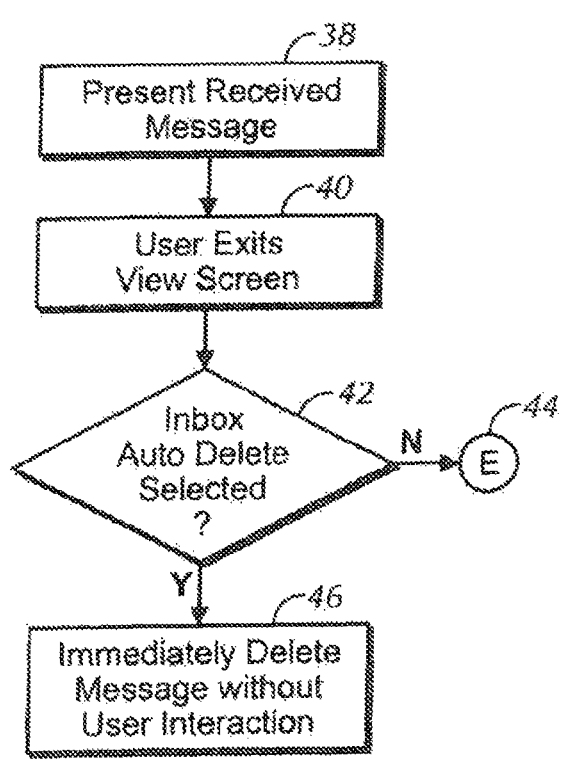
FIGS. 5 and 6 are flow charts of example logic.

FIG. 5 shows that when the processor 18 receives through the transceiver 28 an incoming text message at block 38, it is presented on the display 14a either automatically and/or when the user selects "inbox". The processor 18 initially may generate an audible and/or visual alert to indicate reception of a text message.

Proceeding to block 40, responsive to determination that the user has exited the screen shot in which the incoming text message was displayed, the processor logic flows to decision diamond 42 to determine whether the user selected to automatically delete messages in her inbox. To do this, the processor 18 accesses the user's input from the UI 36 of FIG. 4 which have been stored on the medium 20. If the user had not selected to automatically delete receive messages the logic of FIG. 5 ends at state 44, but if the user had selected to automatically delete received messages from the UI 36 of FIG. 4 the message is automatically deleted from local storage at block 46 immediately and without further user interaction. Equivalent to deletion the message may be moved to a hidden file at block 46 bat in any case no received message can be presented on the display 14a simply by invoking "inbox" from the UI 34 of FIG. 3.

Figure 6:
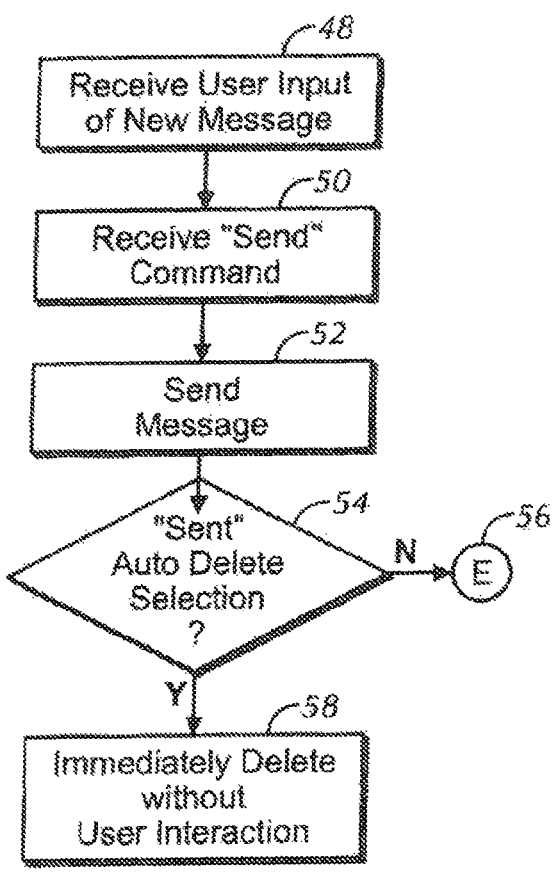

FIG. 6 shows example logic executed by the processor 18 for sending text messages. Commencing at block 48 the processor receives from the keys 16 user input of a new message, typically generated after the user selects "new" message from the UI 34 of FIG. 3. When she is satisfied with her message the user may manipulate, for example, a control key 26 to input a "send" signal to the processor 18 at block 50, which in response sends the message at block 52. If the processor determines at decision diamond 54 that user did not select auto deletion of sent messages from the UI 36 of FIG. 4, the logic of FIG. 6 ends at state 56. Otherwise, the processor immediately and without further user input deletes the sent message from memory 20 at block 58. Equivalent to deletion the message may be moved to a hidden file at block 58 but in any case no sent message can be presented on the display 14a simply by invoking "sent" from the UI 34 of FIG. 3.

In some embodiments, after automatically deleting sent and/or received messages the processor 18 may access the transceiver 28 to signal to the system computer 31 to also delete the message from any storage 31b of the system computer 31. The system computer 31 may obey the delete command or may elect to ignore it if, for instance, government regulations require the retention by telephone companies of text messages to track criminal or terrorist activity or even to keep tabs on common ordinary law-abiding citizens for their own good.

It may now be appreciated that present principles allow a user to select, a priori, to delete sent and received text messages from the phone 10. In other words, the user can, before a message is received, to automatically delete the received message from the inbox once the user is finished viewing it. Likewise, the user can, before an outgoing text message is sent, to automatically delete the sent message from the "sent" file once the message has been transmitted from the phone 10. That way, even if the user's nasty hideous boyfriend snatches her phone from her immediately upon completing reading or sending a text message, he will remain in the dark as to the content of the message.

While the particular TELEPHONE MESSAGING PRIVACY is herein shown and described in detail, it is to be understood that the subject matter which is encompassed by the present invention is limited only by the claims.

What is claimed is:

1. A mobile wireless communication device (WCD) comprising: a processor; and a computer readable storage medium that is not a transitory signal accessible by the processor and comprising instructions executable by the processor to configure the processor for: presenting at least one element on the WCD selectable by a user input to cause at least one message to be automatically rendered inaccessible on the WCD after transmission of the message from the WCD; receiving user initiated input on the WCD, the at least one message having content generated responsive to the user-initiated input; responsive to a user command to send the at least one message, wirelessly sending the at least one message to a mobile wireless communication recipient device; after the message has been sent, automatically rendering inaccessible the at least one message whose content has been generated responsive to the user-initiated input on the WCD, wherein the at least one message whose content has been generated responsive to user-initiated input is also rendered inaccessible on the mobile wireless communication recipient device after having been presented on the mobile wireless communication recipient device for viewing, the at least one message whose content has been generated responsive to user-initiated input being rendered inaccessible on the WCD in that no sent message whose content has been generated responsive to user-initiated input and that is rendered inaccessible can be viewed simply by invoking a mailbox selector on the WCD; wherein rendering inaccessible the at least one message includes precluding presentation of the at least one message on a mobile communication device for viewing.

2. The WCD of claim 1, wherein the instructions are executable to present a user interface (UI) including first and second selector elements respectively selectable to provide input to automatically delete sent messages, and to automatically delete received messages.

3. The WCD of claim 1, wherein the instructions are executable to present a user interface (UI) including a selector element selectable to provide input to automatically delete both sent messages and received messages.

4. The WCD of claim 1, wherein the instructions are executable to present a user interface (UI) including a selector element selectable to provide input to reset automatic deletion of messages such that no messages are automatically deleted.

5. The WCD of claim 1, wherein the instructions are executable for, responsive to receiving input to automatically delete sent messages, automatically deleting a sent message from the medium following transmission of the sent message, and responsive to a determination that the user has not provided input to automatically delete sent messages, not automatically deleting the sent message from the medium following transmission of the sent message.

6. The WCD of claim 1, wherein the instructions are executable for, responsive to receiving input to automatically delete received messages, automatically deleting an incoming message from the medium following viewing of the incoming message, and responsive to not receiving input to automatically delete received messages, not automatically deleting the incoming message following viewing of the incoming message.

7. The WCD of claim 1, wherein the instructions are executable to automatically delete incoming messages from the medium responsive to the user navigating away from a display showing the incoming message.

8. A device comprising: at least one computer memory that is not a transitory signal and that comprises instructions executable by at least one server processor for: providing to a mobile wireless communication device (WCD) an application executable to present at least one user interface (UI) on a display of the WCD, the UI for receiving user input selection to automatically render inaccessible on the WCD at least one message whose content has been generated responsive to user-initiated input after transmission of the message; the application being configured for, after the at least one message has been transmitted, automatically rendering the at least one message inaccessible on the WCD, wherein the at least one message is also rendered inaccessible on a second mobile wireless communication device sending the message to or receiving the message from the WCD after having been presented on the second mobile wireless communication device for viewing, a message being rendered inaccessible on the WCD in that no message that is rendered inaccessible can be viewed by invoking a mailbox selector on the WCD; wherein rendering inaccessible the at least one message includes precluding presentation of the at least one message on the WCD and/or the second a mobile wireless communication device for viewing; communicating using a server, the message between the WCD and the second wireless communication device; and after communicating the message between the WCD and the second mobile wireless communication device, deleting the message on the server.

9. A device comprising: at least one computer memory that is not a transitory signal and that includes instructions executable by at least one processor of a mobile wireless communication device (WCD) to: present on the WCD at least one selector element selectable by a user to automatically render inaccessible on the WCD at least one message; access at least one content of the at least one message, the content being generated responsive to user input; responsive to user command to send the at least one content, send the at least one content to at least one mobile wireless communication recipient device; responsive to user input to automatically render inaccessible the at least one content and after the at least one content has been sent, automatically render inaccessible, on the WCD, the at least one content, wherein the at least one content can also be rendered inaccessible on the mobile wireless communication recipient device after having been presented on the mobile wireless communication recipient device for viewing, a content of the at least one message being rendered inaccessible on the WCD in that no content whose content has been generated responsive to user input and that is rendered inaccessible can be viewed simply by invoking a mailbox selector on the WCD; wherein rendering inaccessible the at least one content includes precluding presentation of the at least one content on a mobile communication device for viewing.

10. The device of claim 9, wherein the instructions are executable to:
   present at least one user interface (UI) on the WCD with selector elements selectable by a user prior to receipt of an incoming content and/or prior to generation of an outgoing content to provide input to automatically delete sent contents, and/or to automatically delete received contents;
   responsive to input to automatically delete sent contents, automatically delete the outgoing content following transmission thereof through the transceiver, and/or responsive to input to automatically delete received contents, automatically delete the incoming content following viewing thereof on the WCD.

11. The device of claim 10, wherein the UI comprises first and second selector elements respectively selectable to provide input to automatically delete sent contents, and to automatically delete received contents.

12. The device of claim 10, wherein the UI includes a selector element selectable to provide input to automatically delete both sent contents and received contents.

13. The device of claim 10, wherein the UI includes a selector element selectable to provide input to reset automatic deletion of contents such that no contents are automatically deleted.

14. The device of claim 9, wherein the instructions are executable for, responsive to input to automatically delete sent contents, automatically deleting outgoing contents from the medium following transmission of the outgoing contents, and responsive to not receiving input to automatically delete sent text contents, not automatically deleting the outgoing content from the medium following transmission of the outgoing content.

15. The device of claim 9, wherein the instructions are executable for, responsive to input to automatically delete received contents, automatically deleting an incoming content from the medium following viewing of the incoming content, and responsive to not receiving input to automatically delete received contents, not automatically deleting incoming contents from the medium following viewing of the incoming contents.

16. The device of claim 15, wherein the incoming content is automatically deleted from the medium responsive to the user navigating away from a display showing the incoming content.

\* \* \* \* \*